Nov. 12, 1957 — R. ROUSSIN — 2,812,587

BOREHOLE CALIPERING APPARATUS

Filed July 13, 1954 — 2 Sheets-Sheet 1

INVENTOR.
RENE ROUSSIN
BY
HIS ATTORNEY

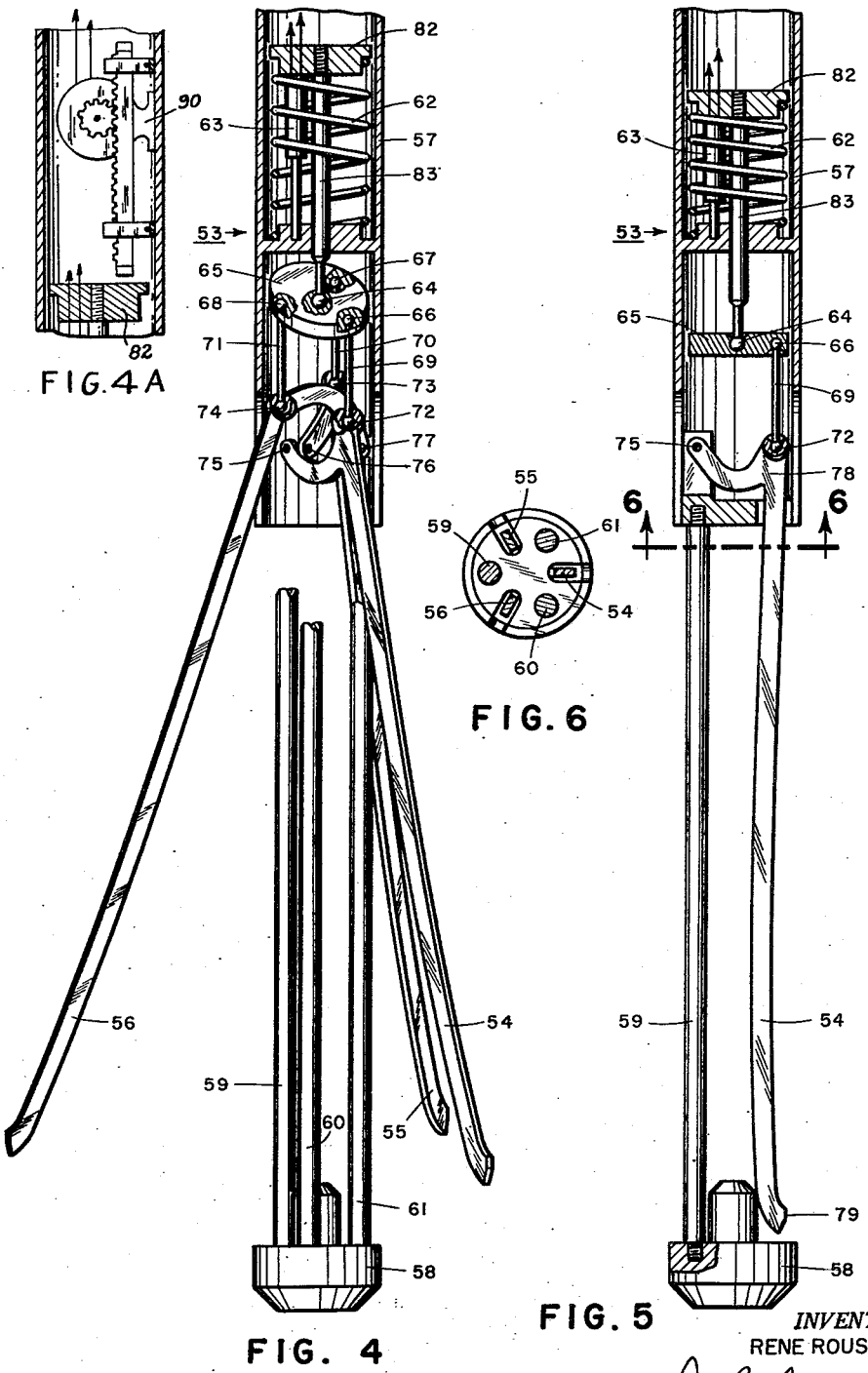

United States Patent Office 2,812,587
Patented Nov. 12, 1957

2,812,587

BOREHOLE CALIPERING APPARATUS

René Roussin, Ridgefield, Conn., assignor, by mesne assignments, to Schlumberger Well Surveying Corporation, Houston, Tex., a corporation of Texas Application July 13, 1954, Serial No. 443,057

5 Claims. (Cl. 33—178)

The present invention relates to borehole apparatus and more particularly to new and improved apparatus for maintaining equipment pressed against the wall of a borehole while passing therethrough.

In recent years it has become accepted oil field practice to employ borehole apparatus in which a plurality of devices movably coupled to a carrier are maintained against the wall of a borehole while the carrier is passing through the borehole. For example, in caliper apparatus for measuring variations in borehole diameter two or more arm members are pivotally coupled to a carrier and the outer extremities thereof forced against the wall of the borehole as the carrier is passed through the hole. The lateral displacement of these outer extremities from the longitudinal axis of the carrier is determined as a measurement of borehole diameter. In other types of apparatus, one or more measuring instruments are affixed to the outer extremities of the pivoted arm members so that continuous measurements may be made against the wall of the borehole as the carrier is moved through the hole.

In general, the arm members employed in such apparatus are coupled together at the carrier and the outer extremities thereof forced away from the carrier axis by a common driving mechanism. Accordingly, these outer extremities maintain the same relative distances from the longitudinal axis of the carrier. Thus, unless the axis of the carrier is truly centered in the well opposite the outer extremities of the arm members, the outer extremity of at least one of the arm members will not be pressed against the wall of the borehole, in which event the diameter measurement or the measurement made from any instrument supposedly against the well wall may be inaccurate.

On the other hand, if the arm members are independently coupled to the carrier so that the outer extremities thereof may have variable relative distances from the longitudinal axis of the carrier, such extremities may be maintained against the well wall even when the carrier is not centered therein, but the apparatus is unduly complicated by the fact that a plurality of independent driving mechanisms are required, one for each arm member. In addition, a plurality of separate displacement measurements must be made and properly combined to obtain an indication of the variations in borehole diameter.

Accordingly, it is an object of the present invention to provide new and improved borehole apparatus in which a plurality of arm members are pivotally coupled to a carrier in such a manner that the outer extremities of such members may maintain variable relative distances from the carrier, but are forced away from the carrier by a single driving mechanism.

Another object of the invention is to provide apparatus of the above type in which the displacement of a single element is substantially indicative of diameter of the borehole.

These and other objects of the invention are attained by providing in combination with a carrier adapted to be passed through a borehole, linkage means coupling a driving mechanism to a plurality of arm members, such that the outer extremities of the arms may have variable relative distances from the longitudinal axis of the carrier and yet the displacement of the driving mechanism is substantially a direct function of the borehole diameter. To this end the driving mechanism in the carrier includes an element selectively movable parallel to the longitudinal axis of the carrier. Pivotally coupled to the movable element at one location is suspension means which is thus adapted to be driven longitudinally by such element but is free to pivot about the one location. The inner portions of the arm members are pivotally coupled to the carrier at different radial locations, and the outer extremities thereof adapted to be extended laterally from the longitudinal axis of the carrier. Linkage units are respectively connected to each arm member and to different pivot locations on the suspension means at points removed from said one location, such that the actual force transmitted to each linkage unit and thus to each arm member may be derived from the driving element via the pivoted suspension means at points having variable vertical displacements. Accordingly, the outer extremities of the arm members may maintain different, variable lateral displacements from the longitudinal axis of the carrier, and yet the vertical displacement of the driving element will be substantially a direct function of the diameter of the borehole.

The invention will be more fully understood with reference to the accompanying drawing in which:

Fig. 4 is a schematic representation, partially in section, of a second typical embodiment of the invention in which three arm members are employed;

Fig. 4A is a sectional view of a continuation of the upper portion of the apparatus shown in Fig. 4;

Fig. 5 is another view of the embodiment shown in Fig 4; and

Fig. 6 is a cross-sectional view of the embodiment shown in Fig. 5 taken through the lines 6—6.

Figure 1:
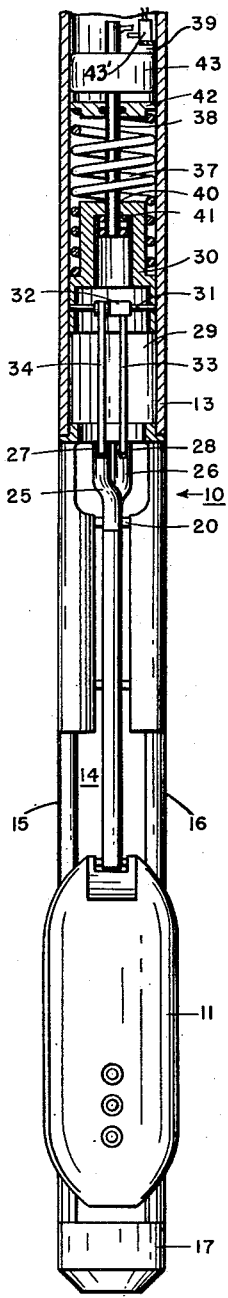
Fig. 1 is a schematic representation, partially in section, of one typical embodiment of the invention in which two arm members are shown in retracted position for ease in passing through a borehole.
Figure 2:
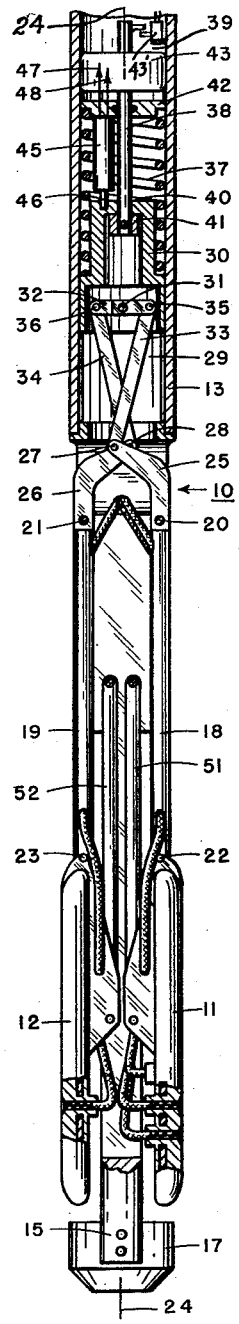
Fig. 2 is a side view of the embodiment shown in Fig. 1.

In Figs. 1 and 2 are shown two views of the lowermost portion of a borehole tool 10 incorporating a typical embodiment of the present invention. For the purposes of illustration, borehole tool 10 is shown as comprising apparatus for maintaining two measuring instruments 11 and 12 against the wall of a borehole at a predetermined orientation, in accordance with the disclosure in copending application Serial No. 419,678, filed March 30, 1954, for "Borehole Apparatus" by Saurenman and Lebourg and assigned to the assignee of the instant application. Borehole tool 10 may comprise a cylindrical housing 13, the upper portion of which (not shown) is adapted to be connected to an electric cable to raise and lower tool 10 through a borehole and to provide the electrical energy necessary for operation. The lower portion of housing 13 is connected by an open frame 14 comprising parallel rod members 15 and 16 to a rounded bottom nose 17.

Two diametrically opposite arm members 18 and 19 are pivotally connected by pins 20 and 21 respectively to the interior of frame 14 such that their outer extremities 22 and 23 are adapted to pivot about pins 20 and 21 away from the longitudinal axis 24 of tool 10. Upper extensions 25 and 26 of arm members 18 and 19, respectively, above pins 20 and 21 extend inwardly towards the axis 24 of tool 10, as shown in Fig. 2, but are displaced laterally as shown in Fig. 1. The configuration of upper extremities 25 and 26 is such that when vertical pressure is applied to pins 27 and 28 in the ends thereof, pins 20 and 21 act as respective fulcra about which pins 27 and 28 respectively may supply leverage to force arm members 18 and 19 away from axis 24.

Movable inside an open lower portion 29 of housing 13 is a driving element 30 adapted to be forceably moved downwardly and upwardly at the discretion of an operator at the surface. A pin 31 connected to driving element 30 pivotally supports a rocker arm 32 which is thus free to rotate about pin 31 but is movable with driving element 30. Linkage means 33 and 34 are pivotally coupled to rocker arm 32 by means of pins 35 and 36 respectively, at opposite ends thereof. Linkage means 33 and 34 are also pivotally coupled by pins 27 and 28, respectively, to extensions 25 and 26 of arm members 18 and 19.

The motive means for driving element 30 may comprise a compression spring 37 tending to force element 30 downwardly, and a rod 38 coupled to element 30 and connected to an electric motor 43, such as a solenoid for example, inside a pressure balanced portion 39 of housing 13. Rod 38 passes through an opening 40 in element 30 and is free to move therethrough but has an enlarged head 41 interior to element 30 to permit rod 38 to withdraw element 30 upwardly against the downward force of spring 37. Rod 38 passes through a pressure seal 42 to the motor 43 in portion 39 of housing 13 which is adapted to pull upwardly on rod 38 and to release said rod for free movement at the discretion of the operator at the surface.

Coupled to driving element 30 is arm 46 of a potentiometer 45, which moves as a function of the vertical position of driving element 30, whereby the electrical output 47—48 of potentiometer 45 supplied to the surface is a direct function of the position of said element.

In operation, rod 38 is locked in its fully upward position by electrically releasable latch means 43' in housing 13, whereby driving element 30 by means of rocker arm 32 and linkage means 33 and 34 maintains arm members 18 and 19 inwardly. Borehole tool 10 may then be freely lowered to the desired level in a borehole.

Figure 3:
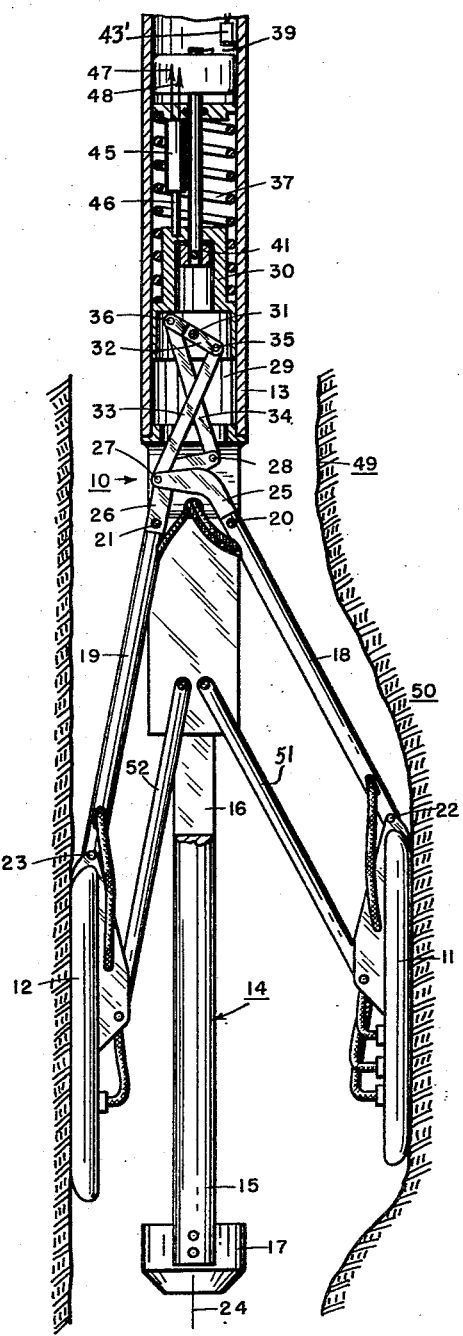
Fig. 3 is another view of the device shown in Fig. 1 with the support arms extended against the wall of an unsymmetrical section of a borehole.

Rod 38 is then released and compression spring 37 forces driving element 30 downwardly. This downward force is applied to rocker arm 32 via pin 31 and thence to linkage means 33 and 34 via pins 35 and 36. Linkage means 33 and 34 in turn transmit the downward force of compression spring 37 to pins 27 and 28 of arm extensions 25 and 26, respectively. As shown in Fig. 3, the leverage supplied by extensions 25 and 26 force outer extremities 22 and 23 against the wall of borehole 49.

If the axis 24 of tool 10 is centered in borehole 49 opposite outer extremities 22 and 23, such extremities will be equidistant from axis 24 since rocker arm 32 will remain parallel to the horizontal, and thus linkage means 33 and 34 maintain symmetry with respect to axis 24. Potentiometer 45 will give a continuous indication of the variations in diameter of borehole 49 as tool 10 is raised through the borehole.

If now tool 10 is raised to level 50 in borehole 10 in which axis 24 is no longer centered in borehole 10 as shown in Fig. 3, spring 37 maintains its downward pressure on driving element 30 and thus on rocker arm 32. However, rocker arm 32 may pivot about pin 31, permitting the downward force transmitted to linkage means 33 and 34 to be applied at different vertical points. Arm member 18 may thus be extended a different lateral distance than arm member 19 since linkage means 33 and 34 may have different vertical displacements. Thus, within the limits set by the distance between pins 35 and 36 and the distances between pins 35 and 27, and pins 36 and 28, the relative lateral distances of outer extremities 22 and 23 from axis 24 may vary, such extremities being maintained against the wall of a borehole regardless of the position of axis 24 relative to the wall of the borehole. It has been found that within practical limits, potentiometer 45 will continue to give readings which are substantially indicative of variations in borehole diameter.

In a commercial tool for use in boreholes having diameter variations from 6 to 12 inches, the following dimensions have been found practical: length of arm members 18 and 19 between pins 20 and 22, and 21 and 23, 12 inches; distance between pins 20 and 27, 21 and 28, 3 inches at an angle of 30° from the axis of arm members 18 and 19; length of linkage members 33 and 34 between pins 27 and 35, 28 and 36, 5⅝ inches; distance between pins 35 and 36 on rocker arm 32, 1¾ inches, which permits a dissymmetry of 3 inches, i. e., one of the measuring instruments 11 or 12 may be as much as 3 inches further than the other from the center of tool 10.

In Figs. 1, 2 and 3, the invention has been described in connection with a tool constructed in accordance with the disclosure in the aforementioned application Serial No. 419,678. Thus outer extremities 22 and 23 are coupled to instruments 11 and 12 respectively, which are additionally coupled to frame 14 by support arms 51 and 52. However, it will be understood that arm members 18 and 19 may be employed alone as for a two arm caliper, or to support one or more instruments.

In caliper instruments it may be desirable to employ three sensing arms displaced 120° about the borehole. In Figs. 4 and 5 there are shown two views of such a caliper 53 in which three caliper arms 54, 55 and 56 are adapted for relatively independent movement in accordance with the present invention. As shown in Fig. 4, housing 57 may be substantially the same as housing 13 in Figs. 1–3, and may be coupled to a bottom nose member 58 by three parallel rods 59, 60 and 61.

In this embodiment a driving element 82, slidable in housing 57 is adapted to be forced upwardly by a compression spring 62 and its movement recorded by potentiometer 63. An electric motor 90 (Fig. 4A) may act to force driving element 82 downwardly against spring 62, when it is desired to retract arms 54, 55 and 56. Element 82 acts through a rod 83.

Driving rod 83 is pivotally coupled by a universal joint 64 to a rocker disc 65 that is free to rotate to describe a sphere about joint 64. Displaced 120° about rocker disc 65 are three additional universal joints 66, 67 and 68 coupling disc 65 to linkage means 69, 70 and 71 respectively. Linkage means 69, 70 and 71 are coupled to caliper arms 54, 55 and 56 by means of universal joints 72, 73 and 74 respectively. Arms 54, 55 and 56 are pivotally connected to housing 57, 120° apart, by means of pins 75, 76 and 77.

As shown in Fig. 5, where only one caliper arm 54 and one rod 59 are reproduced, caliper arm 54 may pivot outwardly on pin 75 from the axis of tool 53 in a given plane (offset 120° from the planes described by arms 55 and 56 respectively). A universal joint 72 is connected in knee 78 of arm 54 such that an upward force tends to force outer extremity 79 against the wall of a borehole. In Fig. 6 is shown a cross-section of Fig. 5 through lines 6—6.

In operation, with joint 64 fully downward, disc 65 and linkage means 69, 70 and 71 maintain arms 54, 55 and 56 inwardly against nose bottom plug 58. Upon release of compression spring 62, rod 83 acting through joint 64 draws disc 65 upwardly. However, since disc 65 is free to rotate about joint 64, the upward force from spring 62 may be applied to linkage means 69, 70 and 71 through universal joints 66, 67 and 68 at different vertical distances from joint 64. Thus arms 54, 55 may be maintained against the wall of the borehole even though the tool 53 is not centered therein, and potentiometer 63 will give a continuous indication of variations in diameter.

It will be understood that many modifications of the embodiments disclosed will occur to those skilled in the art, and thus the appended claims are not to be limited by the illustrative embodiments disclosed herein.

I claim:

1. Borehole apparatus, comprising a housing adapted to be passed through a borehole, a plurality of arm members pivotally connected to said housing such that pressure at a given point on each of said arm members will cause such arm member to pivot relative to said housing, an element in said housing movable relative thereto along a predetermined axis, motive means coupled to said element for selectively moving said element along said axis, suspension means pivotally connected to said element at one location, and separate linkage means respectively interconnecting the given point on each arm member with respective locations on said suspension means removed from said one location and from each other.

2. Borehole apparatus comprising a housing adapted to be passed through a borehole, a plurality of arm members pivotally connected to said housing such that pressure at a given point on each of said arm members will cause such arm member to pivot relative to said housing, an element in said housing movable relative thereto in a direction substantially parallel to the longitudinal axis of said housing, motive means coupled to said element for selectively moving said element along said axis, suspension means pivotally connected to said element at one location such that said suspension means moves with said element at said one location but other locations on said element may assume different radial positions about said one location, and separate linkage means respectively interconnecting the given point on each arm member with respective ones of said other locations.

3. Borehole apparatus comprising a housing adapted to be passed through a borehole, a pair of arm members pivotally connected to said housing such that pressure at a given point on each of said arm members will cause such arm member to pivot relative to said housing, an element in said housing movable relative thereto in a direction substantially parallel to the longitudinal axis of said housing, motive means coupled to said element for selectively moving said element along said axis, a rocker arm, a pivotal connection between substantially the center of said rocker arm and one location on said element such that the center of said rocker arm moves with said element but opposite ends of said rocker arm may assume different radial positions about said one location, and separate linkage means respectively pivotally connected to opposite ends of said rocker arm and to the given point on each arm member.

4. Borehole apparatus comprising a housing adapted to be passed through a borehole, three arm members pivotally displaced 120° about said housing and connected to said housing such that pressure at a given point on each of said arm members will cause such arm member to pivot relative to said housing, an element in said housing movable relative thereto in a direction substantially parallel to the longitudinal axis of said housing, motive means coupled to said element for selectively moving said element along said axis, a rocker disc, a pivotal connection between substantially the center of said rocker disc and one location on said element such that the center of said rocker disc moves with said element but the outer edges of said rocker disc may rotate and describe a sphere with respect to said one location, and separate linkage means respectively pivotally connected to locations displaced 120° about the outer edge of said disc and to the given point on each arm member.

5. Borehole apparatus as in claim 1 including means for transmitting a signal to the surface of the earth representative of the position of said one location along said axis.

References Cited in the file of this patent
UNITED STATES PATENTS

| | | |
|---|---|---|
| 1,708,354 | Cabot | Apr. 9, 1929 |
| 2,660,800 | Wiley | Dec. 1, 1953 |